US011267835B2

(12) United States Patent
Stoessel et al.

(10) Patent No.: US 11,267,835 B2
(45) Date of Patent: Mar. 8, 2022

(54) PROCESS FOR PREPARING ORTHO-METALLATED METAL COMPOUNDS

(71) Applicant: Merck Patent GmbH, Darmstadt (DE)

(72) Inventors: Philipp Stoessel, Frankfurt am Main (DE); Tobias Brueckl, Pfungstadt (DE); Verena Buback, Griesheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 16/486,050

(22) PCT Filed: Feb. 13, 2018

(86) PCT No.: PCT/EP2018/053468
§ 371 (c)(1),
(2) Date: Aug. 14, 2019

(87) PCT Pub. No.: WO2018/149793
PCT Pub. Date: Aug. 23, 2018

(65) Prior Publication Data
US 2020/0048289 A1 Feb. 13, 2020

(30) Foreign Application Priority Data
Feb. 14, 2017 (EP) ..................................... 17155959

(51) Int. Cl.
*C07F 15/00* (2006.01)
(52) U.S. Cl.
CPC ................................ *C07F 15/0033* (2013.01)
(58) Field of Classification Search
CPC . C07F 15/0033; C07F 15/004; H01L 51/0085
See application file for complete search history.

(56) References Cited

U.S. PATENT DOCUMENTS

| | | | | |
|---|---|---|---|---|
| 7,060,372 B2 * | 6/2006 | Fryd | ...................... | C09K 11/06 428/690 |
| 7,923,521 B2 * | 4/2011 | Stoessel | .............. | C07F 15/0086 528/9 |
| 8,420,231 B2 * | 4/2013 | Choi | .................. | C07F 15/0033 428/690 |
| 9,200,023 B2 * | 12/2015 | Konno | ................ | C07F 15/0033 |
| 2004/0077862 A1 | 4/2004 | Stossel et al. | | |
| 2006/0142604 A1 | 6/2006 | Bach et al. | | |
| 2007/0080342 A1 | 4/2007 | Bold et al. | | |
| 2007/0135635 A1 | 6/2007 | Stoessel et al. | | |
| 2008/0312396 A1 | 12/2008 | Stoessel et al. | | |
| 2013/0331577 A1 * | 12/2013 | Van Pee | .............. | C07F 15/0033 546/4 |
| 2014/0378685 A1 | 12/2014 | Catinat | | |
| 2015/0171348 A1 * | 6/2015 | Stoessel | ................ | H05B 33/20 252/301.16 |
| 2015/0263297 A1 * | 9/2015 | Stoessel | ............. | C08G 73/0694 252/301.16 |
| 2015/0270500 A1 * | 9/2015 | Stoessel | .............. | C07F 15/0033 252/301.35 |
| 2015/0318498 A1 * | 11/2015 | Stoessel | .............. | C07F 15/0033 252/301.16 |
| 2015/0333280 A1 * | 11/2015 | Stoessel | .............. | H01L 51/0085 252/519.21 |
| 2015/0349277 A1 * | 12/2015 | Stoessel | .............. | C07F 15/0033 252/301.35 |
| 2016/0233443 A1 * | 8/2016 | Stoessel | ............... | C07D 221/18 |
| 2017/0166599 A1 * | 6/2017 | Abe | .................... | C07F 15/0033 |

FOREIGN PATENT DOCUMENTS

| | | | |
|---|---|---|---|
| CN | 103601760 A | * | 2/2014 |
| EP | 3168223 A1 | | 5/2017 |
| JP | 2004238379 A | | 8/2004 |
| JP | 4035615 B2 | * | 1/2008 |
| JP | 2008-506652 A | | 3/2008 |
| JP | 2009-518324 A | | 5/2009 |
| JP | 2014-505041 A | | 2/2014 |
| JP | 2015-503533 A | | 2/2015 |
| JP | 5692805 B2 | * | 4/2015 |
| WO | 2002060910 A1 | | 8/2002 |
| WO | 2004084326 A2 | | 9/2004 |
| WO | 2004085449 A1 | | 10/2004 |
| WO | 2004099223 A1 | | 11/2004 |
| WO | 2005042548 A1 | | 5/2005 |
| WO | 2003/008069 A1 | | 1/2006 |
| WO | 2007065523 A1 | | 6/2007 |
| WO | 2012084219 A1 | | 6/2012 |
| WO | 2013098189 A1 | | 7/2013 |
| WO | WO-2013098189 A1 * | 7/2013 | .......... C07F 15/0033 |
| WO | 2016006523 A1 | | 1/2016 |
| WO | WO-2016006523 A1 * | 1/2016 | ......... H01L 51/0085 |
| WO | WO-2016009231 A * | 1/2016 | ........... C09K 11/025 |

OTHER PUBLICATIONS

A. Tamayo et al., 125 Journal of the American Chemical Society, 7377-7387 (2003) (Year: 2003).*
CAS Abstract and Indexed Reactions, A. Tamayo et al., 125 Journal of the American Chemical Society, 7377-7387 (2003) (Year: 2003).*
CAS Abstract Marlon A375 (1984) (Year: 1984).*
B. Thiele, Surfactants (2005) (Year: 2005).*
CAS Abstract and Indexed Reaction, H. Konno et al., JP 4035615 (2008) (Year: 2008).*
Hawley's Condensed Chemical Dictionary, p. 1294, 1295 (16th ed., 2016, R.J. Larrañaga ed.) (Year: 2016).*
D. Khossravi et al., 22 Journal of Solution Chemistry, 321-330 (1993) (Year: 1993).*
K. Connors et al., 61 Anal. Chem. 194-198 (1989) (Year: 1989).*
A. Jouyban et al., 59 Pharmazie, 937-941 (2004) (Year: 2004).*
U. Hintermair et al., 135 Journal of the American Chemical Society, 10837-10851 (2013) (Year: 2013).*
International Search Report dated Apr. 4, 2018 in International Patent Application No. PCT/EP2018/053468.
King et al., "Excited-State Properties of Triply Ortho-Metalated Iridium (III) Complex", J. Am. Chem. Soc., 1985, pp. 1431-1432, vol. 107.

(Continued)

*Primary Examiner* — Alexander R Pagano
(74) *Attorney, Agent, or Firm* — Faegre Drinker Biddle & Reath LLP

(57) ABSTRACT

The present invention describes a process for producing tris-orthometalated metal compounds which can be used as coloring components as functional materials in a number of diverse applications that can be broadly attributed to the electronics industry.

15 Claims, No Drawings

(56) References Cited

OTHER PUBLICATIONS

Dedeian et al., "A New Synthetic Route to the Preparation of a Series of Strong Photoreducing Agents: fac Tris-Ortho-Metalaed Complexes of Iridium(III) with Substituted 2-Phenylpyridines", Inorg. Chem., 1991, pp. 1685-1687, vol. 30.
Sprouse et al., "Photophysical Effects of Metal-Carbon Sigma Bonds in Ortho-Metalated Complexes of Ir(III) and Rh (III)", J. Am. Chem. Soc., 1984, pp. 6647-6653, vol. 106.
Colombo et al., "Facial Tris Cyclometalated Rh3+ and Ir3+ Complexes: Their Synthesis, Structure, and Optical Spectroscopic Properties," Inorg. Chem., 1994, pp. 545-550, vol. 33.
Tamayo et al., "Synthesis and Characterization of Facial and Meridional Tris-cyclometalaed Iridium(III) Complexes", J. Am. Chem. Soc., 2003, pp. 7377-7387, vol. 125.

* cited by examiner

PROCESS FOR PREPARING ORTHO-METALLATED METAL COMPOUNDS

RELATED APPLICATIONS

This application is a national stage entry, filed pursuant to 35 U.S.C. § 371, of PCT/EP2018/053468, filed Feb. 13, 2018, which claims the benefit of European Patent Application No. 17155959.4, filed Feb. 14, 2017, which is incorporated herein by reference in its entirety.

The present invention describes a process for preparing tris-cyclometalated iridium compounds from simple iridium starting compounds in aqueous medium.

Organometallic iridium compounds are used as functional materials in a number of diverse applications that can be broadly attributed to the electronics industry, especially as phosphorescent emitters in organic electroluminescent devices. This requires efficient chemical-synthetic access to the corresponding high-purity organometallic compounds. This is of significant importance in particular for the resource-conserving use of the mentioned compound class, given the rarity of Ir.

Various processes are known for the preparation of tris-cyclometalated organoiridium compounds. These have in common that they are carried out in organic solvents or mixtures of organic solvents with water, often at high temperatures and long reaction times. Improvements are still desirable here in order to also be able to carry out the reactions with the addition of smaller amounts, or even without the addition, of organic solvent. Furthermore, improvements in the overall yield and the yield of the proportion of facial isomer are desirable.

It is therefore an object of the present invention to provide a broadly applicable process by means of which tris-cyclometalated iridium complexes can be synthesized easily, in high yield and, in particular, also from readily available iridium(III) halide. In particular, it is an object to provide a broadly applicable process for the synthesis of tris-cyclometalated iridium complexes, which can be carried out in water in order to be able to avoid the use of organic solvents, which are often combustible and/or toxic. A further object is to provide a process for preparing tris-orthometalated iridium complexes which provides a high proportion of the facial isomer.

It has surprisingly been found that the synthesis of tris-cyclometalated iridium complexes starting from iridium halide, halide-bridged dimeric iridium complexes or other iridium reactants can be carried out in water or aqueous solution in very high yields and purities if the reaction is carried out in the presence of a surfactant and optionally in the presence of an additive, for instance a base or an inorganic salt. Furthermore, this process produces the facial isomer in high yield.

A subject of the present invention is therefore a process for preparing a tris-cyclometalated iridium complex by reacting an iridium compound with a bidentate ligand which coordinates to the iridium with cyclometalation, characterized in that the process is carried out in aqueous medium with addition of a surfactant.

A tris-cyclometalated iridium complex in the context of the present invention is an iridium complex which has three bidentate, cyclometalated ligands. In the context of the present invention, the term "tris-cyclometalated iridium complex" also includes iridium complexes in which either two of the three bidentate cyclometalated ligands or all three bidentate cyclometalated ligands are covalently linked to one another via a bridge, so that either a tetradentate ligand or a tripodal hexadentate ligand is formed. In the context of the present invention, a cyclometalated ligand is a ligand which forms a metallacycle with the metal to which it coordinates, with at least one metal-carbon bond being present between the ligand and the metal. The metallacycle formed by the iridium and the ligands preferably has a ring size of 5 or 6 ring atoms, in particular of 5 ring atoms. This is shown schematically hereinafter:

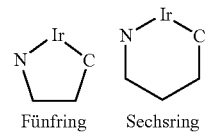

Fünfring    Sechsring wherein N is a coordinating nitrogen atom and C is a coordinating carbon atom and the carbon atoms depicted are atoms of the ligand.

Depending on starting product and ligand, both homoleptic and heteroleptic metal complexes can be synthesized. A homoleptic complex is understood to mean a compound in which only identical ligands are bonded to a metal. Heteroleptic complexes are those in which different ligands are bonded to the metal. This applies both to ligands with different ligand base structure as well as to ligands which have the same basic structure, but which are substituted differently.

In a preferred embodiment of the invention, the tris-cyclometalated iridium complex is a homoleptic complex, i.e. the three bidentate cyclometalated ligands are preferably identical. This preference applies in particular if the three ligands are not covalently linked to a hexadentate tripodal ligand via a bridge. If the three ligands are covalently linked to a hexadentate, tripodal ligand via a bridge, complexes are also equally preferred in which the individual bidentate sub-ligands of the tripodal ligand differ from each other.

In a further preferred embodiment of the invention, the tris-cyclometalated iridium complex is the facial isomer of the complex. Facial or meridional coordination in the context of this application describes the octahedral environment of the iridium with the six donor atoms. Facial coordination occurs when three identical donor atoms occupy a triangular surface in the (pseudo)octahedral coordination polyhedron and three identical donor atoms distinct from the first occupy another triangular surface in the (pseudo) octahedral coordination polyhedron. In a meridional coordination, three identical donor atoms occupy one meridian in the (pseudo) octahedral coordination polyhedron and three identical donor atoms distinct from the first occupy the other meridian in the (pseudo) octahedral coordination polyhedron. This is shown below by the example of the coordination of three N-donor atoms and three C-donor atoms (Scheme 1). Since this definition refers to donor atoms and not to the bidentate ligands that provide these donor atoms, the three bidentate cyclometalated ligands may be the same or different and nonetheless correspond to facial or meridional coordination in the context of this application. Identical donor atoms are understood to be those which consist of the same elements (e.g. carbon or nitrogen), irrespective of whether these elements are incorporated in different structures.

Scheme 1:

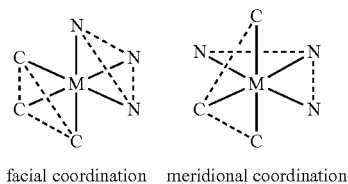

facial coordination    meridional coordination

The iridium complex obtainable by the process of the invention preferably has a structure of the following formula (1)

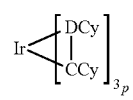    Formula (1)

wherein:
DCy is the same or different at each instance and is a heteroaryl group having 5 to 14 aromatic ring atoms, which contains at least one neutral donor atom selected from nitrogen or a carbene carbon atom via which the group is bonded to the iridium, and which heteroaryl group can be substituted by one or more substituents R;
CCy is the same or different at each instance and is an aryl or heteroaryl group having 5 to 14 aromatic ring atoms, which contains a carbon atom via which the group is bonded to the iridium, and which aryl or heteroaryl group can bear one or more substituents R;
the groups DCy and CCy are connected to one another via a covalent bond and can furthermore be connected to one another via a radical R;
R is the same or different at each instance and is H, D, F, Cl, Br, I, $NO_2$, CN, OH, $N(R^1)_2$, $OR^1$, $SR^1$, $B(OR^1)_2$, CHO, COOH, $CON(R^1)_2$, $C(=O)R^1$, $P(=O)(R^1)_2$, $S(=O)R^1$, $S(=O)_2R^1$, $Si(R^1)_3$, a straight-chain alkyl group having 1 to 20 carbon atoms or an alkenyl or alkynyl group having 2 to 20 carbon atoms or a branched or cyclic alkyl group having 3 to 20 carbon atoms, wherein the alkyl, alkenyl or alkynyl group can in each case be substituted by one or more radicals $R^1$ and/or wherein one or more non-adjacent $CH_2$ groups may be replaced by O, S, $NR^1$, $CONR^1$ or CO—O, or an aromatic or heteroaromatic ring system which has 5 to 40 aromatic ring atoms and may be substituted by one or more radicals $R^1$; in this case, two or more substituents R, both on the same ring CCy or DCy or else on the two different rings CCy and DCy together may, with one another or with $R^1$, form a further ring system;
$R^1$ is the same or different at each instance and is H, D, F, Cl, Br, I, $N(R^2)_2$, $OR^2$, $SR^2$, CN, $NO_2$, $Si(R^2)_3$, $B(OR^2)_2$, $C(=O)R^2$, $P(=O)(R^2)_2$, $S(=O)R^2$, $S(=O)_2R^2$, $OSO_2R^2$, a straight-chain alkyl group having 1 to 20 carbon atoms or an alkenyl or alkynyl group having 2 to 20 carbon atoms or a branched or cyclic alkyl group having 3 to 20 carbon atoms, wherein the alkyl, alkenyl or alkynyl group may in each case be substituted by one or more $R^2$ radicals and/or wherein one or more non-adjacent $CH_2$ groups may be replaced by $Si(R^2)_2$, C=O, $NR^2$, O, S or $CONR^2$, or an aromatic or heteroaromatic ring system which has 5 to 40 aromatic ring atoms and may be substituted in each case by one or more radicals $R^2$; in this case, a plurality of substituents $R^1$ may also form a ring system with one another;
$R^2$ is the same or different at each instance and is H, D, F or an aliphatic, aromatic and/or heteroaromatic organic radical, especially a hydrocarbyl radical, having 1 to 20 carbon atoms, in which one or more hydrogen atoms may also be replaced by F;

in this case, it is also possible for two CCy-DCy ligands to be joined to one another via radicals R to form a tetradentate ligand or all three CCy-DCy ligands to be joined to one another via radicals R to form tripodal hexadentate ligands.

The bidentate ligand preferably has a structure of the following formula (2),

    Formula (2)

wherein DCy and CCy have the meanings given under formula (1). Here, the hydrogen atom is bonded to CCy in the ortho position to the bond of DCy.

If the radicals form a ring system together, fused aromatic or non-aromatic systems can be formed therefrom. Generally, the ring system formed in this way can be monocyclic or polycyclic, and it can be aliphatic, heteroaliphatic, aromatic or heteroaromatic. It should again be emphasized explicitly that radicals which are bonded to different groups, for example to CCy and DCy, together may also form a ring system.

The wording that two or more radicals together may form a ring, in the context of the present description, should be understood to mean, inter alia, that the two radicals are joined to one another by a chemical bond with formal elimination of two hydrogen atoms. This is illustrated by the following scheme:

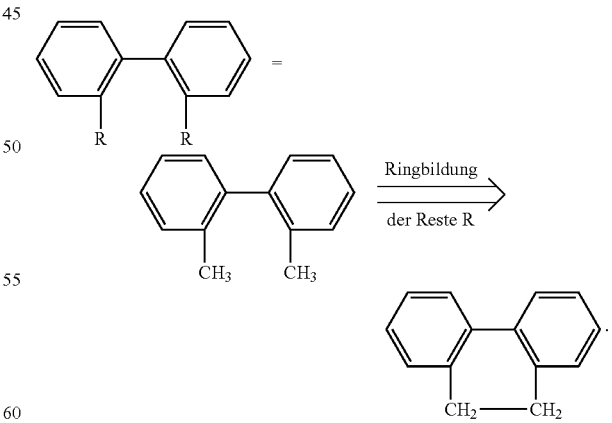

In addition, however, the abovementioned wording should also be understood to mean that, if one of the two radicals is hydrogen, the second radical binds to the position to which the hydrogen atom was bonded, forming a ring. This shall be illustrated by the following scheme:

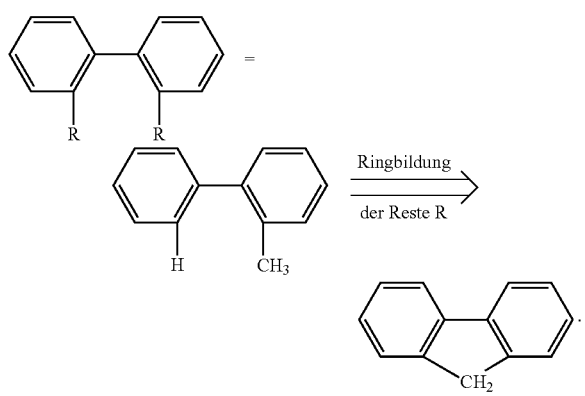

The formation of an aromatic ring system shall be illustrated by the following scheme:

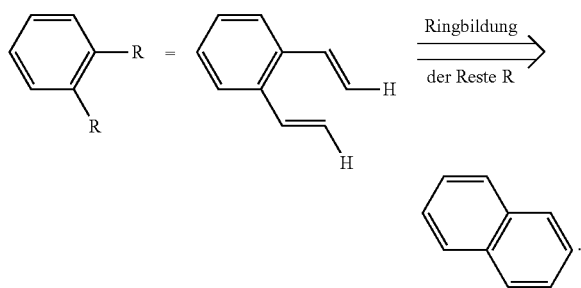

An aryl group in the context of this invention contains 6 to 40 carbon atoms; a heteroaryl group in the context of this invention contains 2 to 40 carbon atoms and at least one heteroatom, with the proviso that the sum total of carbon atoms and heteroatoms is at least 5. The heteroatoms are preferably selected from N, O and/or S. Here, an aryl group or heteroaryl group is understood to mean either a simple aromatic ring, i.e. benzene, or a simple heteroaromatic ring, for example pyridine, pyrimidine, thiophene, etc., or a fused aryl or heteroaryl group, for example naphthalene, anthracene, phenanthrene, quinoline, isoquinoline, etc.

An aromatic ring system in the context of this invention contains 6 to 40 carbon atoms in the ring system. A heteroaromatic ring system in the context of this invention contains 1 to 40 carbon atoms and at least one heteroatom in the ring system, with the proviso that the sum total of carbon atoms and heteroatoms is at least 5. The heteroatoms are preferably selected from N, O and/or S. An aromatic or heteroaromatic ring system in the context of this invention should be understood to mean a system which does not necessarily contain only aryl or heteroaryl groups but rather in which several aryl or heteroaryl groups may also be interrupted by a non-aromatic unit such as a carbon, nitrogen or oxygen atom or a carbonyl group. For example, systems such as 9,9'-spirobifluorene, 9,9-diarylfluorene, triarylamine, diaryl ethers, stilbene, etc. shall thus also be regarded as aromatic ring systems in the context of this invention, and likewise systems in which two or more aryl groups are interrupted, for example, by a linear or cyclic alkyl group or by a silyl group. In addition, systems in which two or more aryl or heteroaryl groups are bonded directly to one another, for example biphenyl, terphenyl, quaterphenyl or bipyridine, shall likewise be regarded as an aromatic or heteroaromatic ring system.

A cyclic alkyl group in the context of this invention is understood to mean a monocyclic, bicyclic or polycyclic group.

In the context of the present invention, a $C_1$ to $C_{40}$ alkyl group in which also individual H atoms or $CH_2$ groups can be substituted by the abovementioned groups, is particularly preferably understood to mean the radicals methyl, ethyl, n-propyl, i-propyl, n-butyl, i-butyl, s-butyl, t-butyl, 2-methylbutyl, n-pentyl, s-pentyl, cyclopentyl, n-hexyl, cyclohexyl, n-heptyl, cycloheptyl, n-octyl, cyclooctyl, 2-ethylhexyl, adamantyl, trifluoromethyl, pentafluoroethyl, 2,2,2-trifluoroethyl, ethenyl, propenyl, butenyl, pentenyl, cyclopentenyl, hexenyl, cyclohexenyl, heptenyl, cycloheptenyl, octenyl, cyclooctenyl, ethynyl, propynyl, butynyl, pentynyl, hexynyl or octynyl. A $C_1$ to $C_{40}$ alkoxy group is particularly preferably understood to mean methoxy, ethoxy, n-propoxy, i-propoxy, n-butoxy, i-butoxy, s-butoxy, t-butoxy or 2-methylbutoxy. An aromatic or heteroaromatic ring system having 1 to 30 aromatic ring atoms, which may be substituted in each case with the abovementioned radicals $R^2$ and $R^3$ and which may be joined to the aromatic or heteroaromatic via any position is understood in particular to mean groups which are derived from benzene, naphthalene, anthracene, phenanthrene, pyrene, chrysene, perylene, fluoranthene, tetracene, pentacene, benzopyrene, biphenyl, biphenylene, terphenyl, terphenylene, fluorene, spirobifluorene, truxene, isotruxene, dihydrophenanthrene, dihydropyrene, tetrahydropyrene, cis- or trans-indenofluorene, furan, benzofuran, isobenzofuran, dibenzofuran, thiophene, benzothiophene, isobenzothiophene, dibenzothiophene, pyrrole, indole, isoindole, carbazole, pyridine, quinoline, isoquinoline, quinoxaline, quinazoline, acridine, phenanthridine, benzo-5,6-quinoline, benzo-6,7-quinoline, benzo-7,8-quinoline, phenothiazine, phenoxazine, pyrazole, indazole, imidazole, benzimidazole, naphthimidazole, phenanthrimidazole, pyridimidazole, pyrazine imidazole, quinoxaline imidazole, oxazole, benzoxazole, naphthoxazole, anthroxazole, phenanthroxazole, isoxazole, 1,2-thiazole, 1,3-thiazole, benzothiazole, pyridazine, benzopyridazine, pyrimidine, benzpyrimidine, pyrazine, phenazine, naphthyridine, azacarbazole, benzocarboline, phenanthroline, 1,2,3-triazole, 1,2,4-triazole, benzotriazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 1,3,5-triazine, 1,2,4-triazine, 1,2,3-triazine, tetrazole, 1,2,4,5-tetrazine, 1,2,3,4-tetrazine, 1,2,3,5-tetrazine, purine, pteridine, indolizine and benzothiadiazole.

In general, all ligands commonly used in cyclometalated complexes for use in organic electroluminescent devices can be used in the process according to the invention.

In preferred complexes of the formula (1) or ligands of the formula (2), the symbol CCy is an aryl or heteroaryl group having 5 to 13 aromatic ring atoms, particularly preferably 6 to 10 aromatic ring atoms, very particularly preferably having 6 aromatic ring atoms, which may in each case be substituted by one or more substituents R. CCy is especially preferably a phenyl group which may be substituted by one or more substituents R. In this case, the uncoordinated ligand must have an unsubstituted carbon atom in at least one ortho position to the bond of DCy, which carbon atom can then bind to the iridium.

Particularly preferred aromatic groups CCy are phenyl, naphthyl, fluorenyl and phenanthrenyl, very particularly preferably phenyl and naphthyl, in particular phenyl, which may in each case be substituted by one or more radicals R. Preferred heteroaromatic groups CCy are those having at least one heteroatom and at least two carbon atoms, wherein the sum of heteroatoms and carbon atoms must be at least 5. The heteroatoms are preferably selected from N, S and/or O. Preferred heteroaromatic groups CCy or DCy comprise 5 to 14 aromatic ring atoms, particularly preferably 5, 6, 9 or 10 aromatic ring atoms. Particularly preferred heteroaromatic groups are derived from thiophene, pyrrole, furan, imidazole, pyrazole, pyridine, pyrazine, pyrimidine, pyridazine, benzothiophene, indole, carbazole, benzofuran, quinoline, isoquinoline or quinoxaline, which in each case may be substituted by one or more radicals R.

Preferred embodiments of the group CCy are the structures of the following formulae (CCy-1) to (CCy-20),

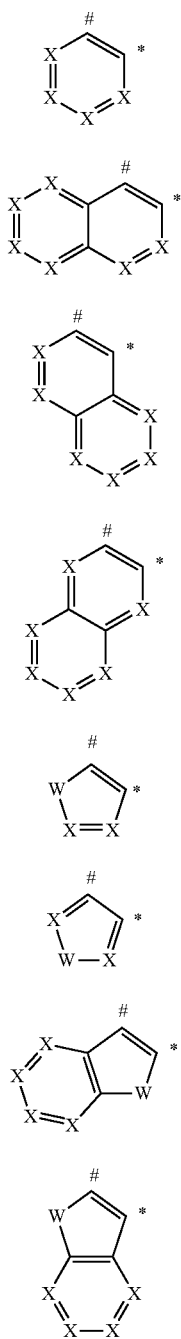

(CCy-1)

(CCy-2)

(CCy-3)

(CCy-4)

(CCy-5)

(CCy-6)

(CCy-7)

(CCy-8)

-continued

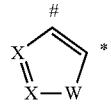

(CCy-9)

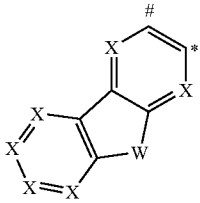

(CCy-10)

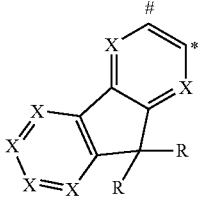

(CCy-11)

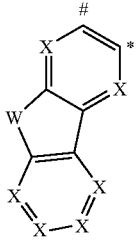

(CCy-12)

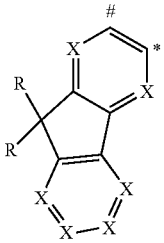

(CCy-13)

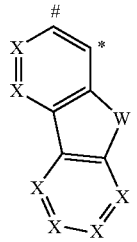

(CCy-14)

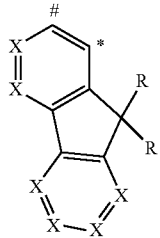

(CCy-15)

(CCy-16)
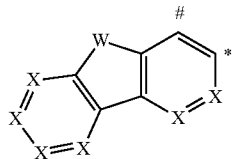

(CCy-17)
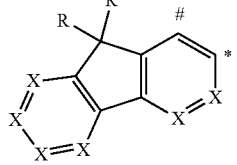

(CCy-18)
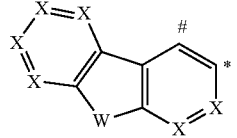

(CCy-19)
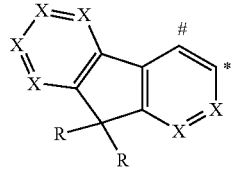

(CCy-20)
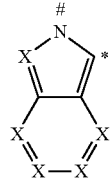

wherein the group binds in each case to the position in DCy indicated by # and coordinates to the iridium at the position indicated by *, R has the meanings given above and the further symbols used are as follows:

X is the same or different at each instance and is CR or N, with the proviso that at most two symbols X per ring are N;

W is the same or different at each instance and is NR, O or S.

Preferably, overall at most two symbols X in CCy are N, particularly preferably at most one symbol X in CCy is N, and very particularly preferably all symbols X are CR.

Particularly preferred groups CCy are the groups of the following formulae (CCy-1a) to (CCy-20a), (CCy-1a)
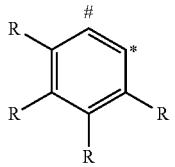

(CCy-1b)
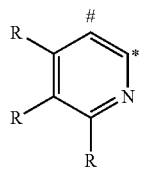

(CCy-1c)
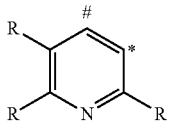

(CCy-1d)
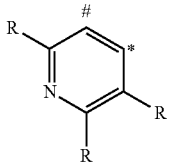

(CCy-1e)
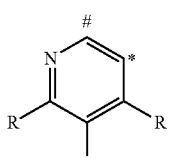

(CCy-1f)
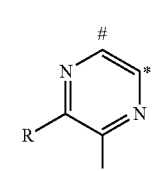

(CCy-1g)
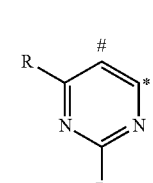

(CCy-1h)
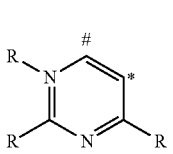

(CCy-2a)
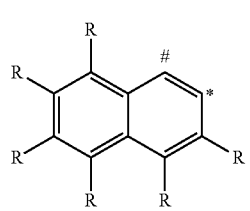

(CCy-2b)
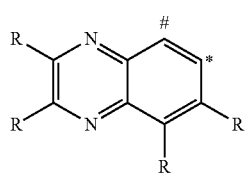

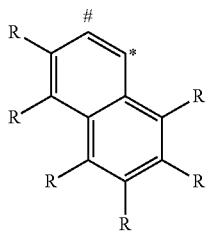 (CCy-3a)
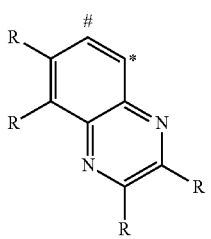 (CCy-3b)
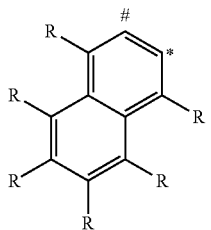 (CCy-4a)
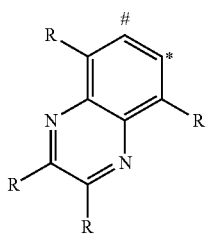 (CCy-4b)
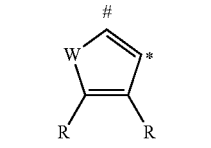 (CCy-5a)
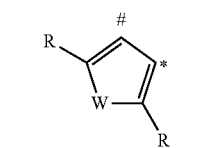 (CCy-6a)
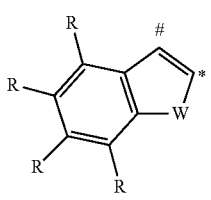 (CCy-7a)
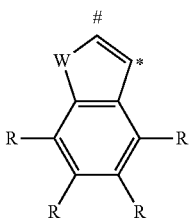 (CCy-8a)
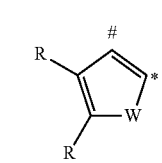 (CCy-9a)
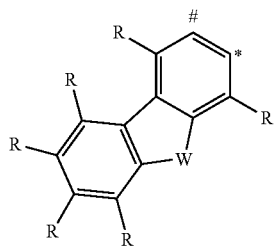 (CCy-10a)
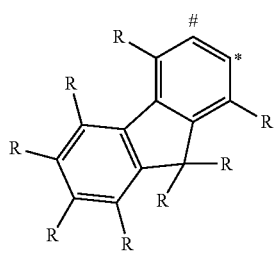 (CCy-11a)
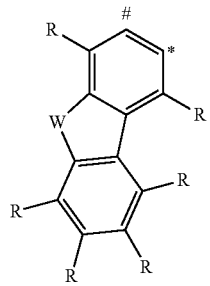 (CCy-12a)
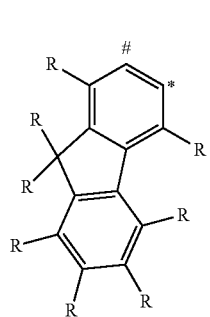 (CCy-13a)

wherein the symbols used have the meanings given above.

Preferred groups among the groups (CCy-1) to (CCy-20) are the groups (CCy-1), (CCy-3), (CCy-8), (CCy-10), (CCy-12), (CCy-13) and (CCy-16), and are particularly preferably the groups (CCy-1a), (CCy-3a), (CCy-8a), (CCy-10a), (CCy-12a), (CCy-13a) and (CCy-16a).

In preferred complexes of the formula (1) or ligands of the formula (2), the symbol DCy is the same or different at each instance and is a heteroaryl group having 5 to 13 aromatic ring atoms, particularly preferably 6 to 10 aromatic ring atoms, very particularly preferably having 6 aromatic ring atoms, which may in each case be substituted by one or more substituents R. Here DCy must comprise a nitrogen atom in at least one ortho position to the bond of CCy or a carbene carbon atom or the precursor of a carbene carbon atom as donor atom.

Particularly preferred rings DCy are selected from pyridine, quinoline, isoquinoline, quinoxaline, quinazoline, 2-azaanthracene, phenanthridine, oxazole, thiazole, benzoxazole or benzothiazole, in particular pyridine, quinoline, isoquinoline or quinazoline, which may in each case be substituted by one or more radicals R.

Preferred embodiments of the group DCy are the structures of the following formulae (DCy-1) to (DCy-14), (DCy-5)
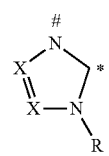

(DCy-6)
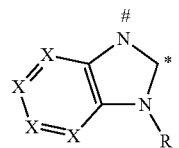

(DCy-7)
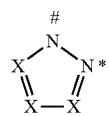

(DCy-8)
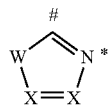

(DCy-9)
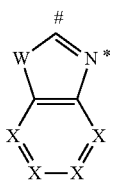

(DCy-10)
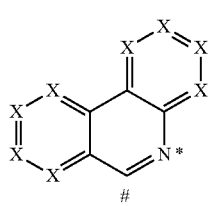

(DCy-11)
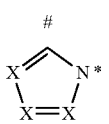

(DCy-12)
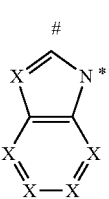

(DCy-13)
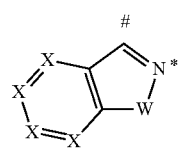

(DCy-9)
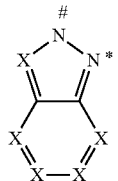

wherein the group binds in each case to the position in CCy indicated by # and coordinates to the iridium at the position indicated by *, and wherein X, W and R have the meanings given above.

Here, the groups (DCy-1) to (DCy-4), (DCyD-7) to (DCy-10), (DCy-13) and (DCy-14) coordinate via a neutral nitrogen atom, (DCy-5) and (DCy-6) via a carbene carbon atom and (DCy-11) and (DCy-12) via an anionic nitrogen atom to the metal.

Preferably, overall at most two symbols X in DCy are N, particularly preferably at most one symbol X in DCy is N, and very particularly preferably all symbols X are CR.

Particularly preferred CyD groups are the groups of the following formulae (CyD-1a) to (CyD-14b):

(DCy-1a)

(DCy-2a)

(DCy-3a)

(DCy-3b)

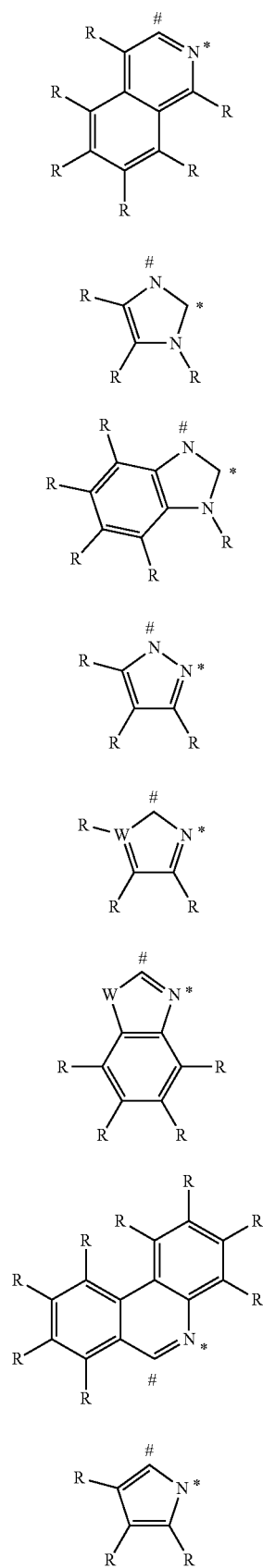
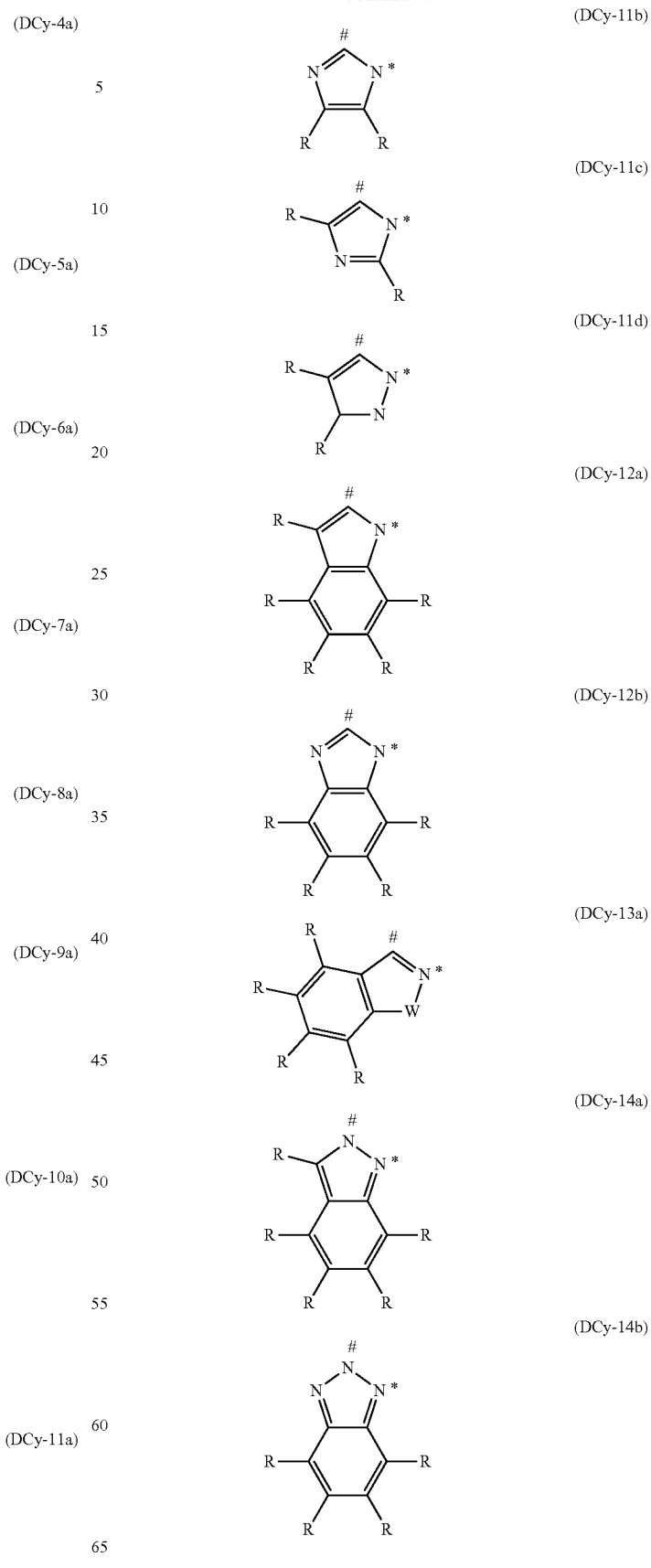
wherein the symbols used have the meanings given above.

Preferred groups among the groups (DCy-1) to (DCy-14) are the groups (DCy-1), (DCy-2), (DCy-3), (DCy-4), (DCy-5) and (DCy-6), in particular (DCy-1), (DCy-2) and (DCy-3), and are particularly preferably the groups (DCy-1a), (DCy-2a), (DCy-3a), (DCy-4a), (DCy-5a) and (DCy-6a), in particular (DCy-1a), (DCy-2a) and (DCy-3a).

In a particularly preferred embodiment of the invention, the ligand is a phenylpyridine derivative of the following formula (2a),

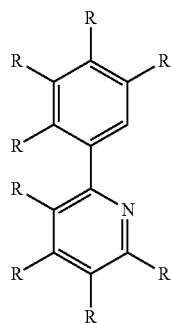

Formel (2a)

wherein R has the meanings given above.

In a preferred embodiment of the invention, the radical R on CCy or DCy or in formula (2a) is the same or different at each instance and is selected from the group consisting of H, D, F, Cl, Br, CN, a straight-chain alkyl group having 1 to 10 carbon atoms or an alkenyl or alkynyl group having 2 to 10 carbon atoms or a branched or cyclic alkyl group having 3 to 10 carbon atoms, wherein the alkyl, alkenyl or alkynyl group can in each case be substituted by one or more radicals $R^1$ and/or wherein one or more non-adjacent $CH_2$ groups may be replaced by O, or an aromatic or heteroaromatic ring system which has 5 to 40 aromatic ring atoms and may be substituted by one or more radicals $R^1$; in this case, two or more substituents R, both on the same ring CCy or DCy or else on the two different rings CCy and DCy together may, again with one another or with $R^1$, form a further ring system. Particularly preferably, the radical R is the same or different at each instance and is selected from the group consisting of H, F, CN, a straight-chain alkyl group having 1 to 5 carbon atoms or an alkenyl or alkynyl group having 2 to 5 carbon atoms or a branched or cyclic alkyl group having 3 to 6 carbon atoms, wherein the alkyl, alkenyl or alkynyl group can in each case be substituted by one or more radicals $R^1$, or an aromatic or heteroaromatic ring system which has 6 to 13 aromatic ring atoms and may be substituted by one or more radicals $R^1$; in this case, two or more substituents R, both on the same ring CCy or DCy or else on the two different rings CCy and DCy together may, again with one another or with $R^1$, form a further ring system. Furthermore, a plurality of radicals R at different ligands can be joined to one another to form a polypodal ligand.

In a further preferred embodiment of the invention, the radical $R^1$ is the same or different at each instance and is selected from the group consisting of H, D, F, a straight-chain alkyl group having 1 to 5 carbon atoms or an alkenyl or alkynyl group having 2 to 5 carbon atoms or a branched or cyclic alkyl group having 3 to 6 carbon atoms, wherein the alkyl, alkenyl or alkynyl group can in each case be substituted by one or more radicals $R^2$, or an aromatic or heteroaromatic ring system which has 5 to 13 aromatic ring atoms and may be substituted in each case by one or more radicals $R^2$; in this case, a plurality of substituents $R^1$ may also together form a ring system.

Preferred iridium compounds which can be used as reactant in the inventive process are the compounds of the following formulae (3) to (8),

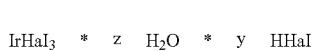

Formel (3)

Formel (4)

Formel (5)

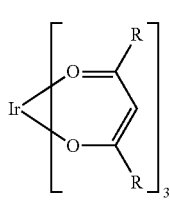

Formel (6)

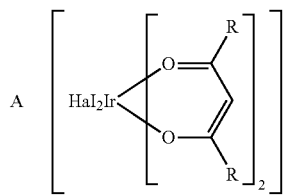

Formel (7)

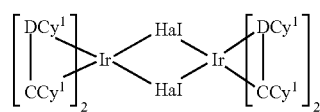

Formel (8)

wherein R has the meanings given above, $CCy^1$ is the same or different and has the same meanings as CCy, $DCy^1$ is the same or different and has the same meanings as DCy and the following applies for the further symbols and indices used:

Hal is the same or different at each instance and is F, Cl, Br or I;

A is the same or different at each instance and is an alkali metal cation, an ammonium cation, a tetraalkylammonium cation having 4 to 40 carbon atoms or a tetraalkylphosphonium cation having 4 to 40 carbon atoms;

z is 0 to 100;

y is 0 to 100.

In this case, R in the formulae (5), (6) and (7) is preferably an alkyl group having 1 to 10 carbon atoms or an aromatic or heteroaromatic ring system which has 5 to 12 aromatic ring atoms and may be substituted by one or more radicals $R^1$. Particularly preferably, R in the formulae (5), (6) and (7) is an alkyl group having 1 to 5 carbon atoms, in particular methyl or tert-butyl.

Preferred compounds according to formula (3) are those in which the index z is 1 to 10, particularly preferably 2 to 4. Preferred compounds according to formula (3) are furthermore those in which the index y is 0 to 10, particularly preferably 0 to 3.

Preferred compounds according to formula (4) are those in which the index z is 0 to 10, particularly preferably 0 to 3. Preferred compounds according to formula (4) are furthermore those in which the index y is 0 to 10, particularly preferably 0 to 3, very particularly preferably 0.

The indices z and y need not be integers, since the reactants may also comprise non-stoichiometric amounts of water and HHal, ie hydrogen halide. Especially the water content can vary in each batch, since hygroscopic metal salts are involved. However, the proportion of water in the reactant has no influence on the reaction since the reaction is carried out in aqueous medium.

Preferred compounds of the formulae (3), (4), (7) and (8) are furthermore those in which the symbol Hal is the same or different at each instance and is Cl or Br, particularly preferably Cl.

The process is carried out according to the invention in aqueous medium in the presence of a surfactant. Surfactants are generally known to those skilled in the art and are substances which reduce the surface tension of a liquid or the interfacial tension between two phases and allow or assist the formation of emulsions or act as solubilizers or form micelles. Generally, surfactants are amphiphilic (bifunctional) compounds having at least one hydrophobic and one hydrophilic moiety. In this case, the hydrophobic radical is preferably a hydrocarbon chain, in particular having 8 to 22 carbon atoms, or an alkyl ether, for example an alkylpolyethylene glycol ether. The hydrophilic radical is either a negatively or positively charged or a neutral polar end group.

According to the invention, various surfactants may be used. This includes nonionic, anionic, cationic and amphoteric surfactants. In a preferred embodiment of the invention, anionic surfactants are used, in particular alkyl carboxylates, alcohol ether carboxylates, alkylbenzenesulfonates, alkyl sulfonates, alkyl ether sulfates and/or alcohol sulfates.

Preferred alkyl carboxylates have the general formula R'—COO$^-$, wherein R' is a saturated or unsaturated alkyl radical having 5 to 25 carbon atoms. Preferred alcohol ether carboxylates have the general formula $C_nH_{2n+1}$—(O—$C_2H_4)_m$—COO$^-$, wherein n is preferably an integer from 5 to 25 and m is preferably an integer from 5 to 25. Preferred alkylbenzenesulfonates have the general formula $C_nH_{2n+1}$—$C_6H_5$—$SO_3^-$, wherein n is preferably an integer from 5 to 25. Preferred alkyl sulfonates have the general formula $C_nH_{2n+1}$-$SO_3^-$, wherein n is preferably an integer from 5 to 25, preferably 8 to 20, particularly preferably 10 to 13. Preferred alkyl ether sulfates have the general formula $C_nH_{2n+1}$—(O—$C_2H_4)_m$—O—$SO_3^-$, wherein n is preferably an integer from 5 to 25 and m is preferably an integer from 5 to 25, preferably from 10 to 16, particularly preferably from 11 to 14. Preferred alcohol sulfates have the general formula $C_nH_{2n+1}$—O—$SO_3^-$, wherein n is preferably an integer from 5 to 25, preferably from 10 to 16, particularly preferably from 12 to 14.

At the same time, the anionic surfactants preferably comprise alkali metal, alkaline earth metal, ammonium, tetraalkylammonium, tetraalkylphosphonium and/or tetraarylphosphonium cations as counterions. Alkali metal cations are understood to mean lithium, sodium, potassium, rubidium and cesium cations, preferably sodium and potassium cations. Tetraalkylammonium cations are preferably understood to mean those with in total 4 to 40 carbon atoms, preferably 4 to 20 carbon atoms, especially tetramethylammonium, tetraethylammonium, tetrapropylammonium and tetrabutylammonium. Tetraalkylphosphonium cations are preferably understood to mean those with in total 4 to 40 carbon atoms, especially tetramethylphosphonium, tetraethylphosphonium, tetrapropylphosphonium and tetrabutylphosphonium. Tetraarylphosphonium cations are preferably understood to mean those with in total 20 to 40 carbon atoms, preferably 24 to 30 carbon atoms, especially tetraphenylphosphonium and tetratolylphosphonium. Preference is given to sodium, potassium, ammonium and/or tetraalkylammonium cations, wherein the alkyl groups are the same or different at each instance and have 1 to 4 carbon atoms. Alternatively, it is also possible to use as surfactants, instead of carboxylates, sulfonates and sulfates, the appropriate corresponding acids of the surfactants and a corresponding amount of base.

Particular preference is given to using linear alkylbenzenesulfonates, linear alkylpolyethylene glycol ether sulfates or mixtures comprising alkylbenzenesulfonates and/or linear alkylpolyethylene glycol ether sulfates as surfactants. Very particularly preferred alkylbenzenesulfonates are n-$C_{10}$-$C_{13}$ alkylbenzenesulfonates, for instance Marlon A375, Marlon ARL, Marlopon AT50 or Marlon AS3 from Sasol, and very particularly preferred alkylpolyethylene glycol ether sulfates are n-$C_{12}$-$C_{14}$ alkylpolyethylene glycolether sulfates, for instance Marlinat 242/70 C or Marlinat 242/90 M from Sasol.

The preferred weight ratio of iridium salt to surfactant is 1:0.05 to 1:5, particularly preferably 1:0.1 to 1:1, very particularly preferably 1:0.2 to 1:0.5.

In one embodiment of the invention, the process is carried out in the presence of an additive. In this case, the additive is preferably selected from the group consisting of bases, in particular Brønsted bases, and inorganic salts.

If the inventive process is carried out in the presence of a base, the base used may be organic or inorganic. A base in the context of the present invention is any compound which is capable of forming hydroxide ions in aqueous solution and thus increasing the pH of the solution. The object of the base in the inventive process is inter alia to scavenge the acid liberated in the cyclometalation reaction, for example HHal. Depending on the base used, however, a different ratio of facial to meridional iridium complex is also observed, and so the base also has an influence on the complexation reaction itself.

In a preferred embodiment of the invention, a base is used which is completely miscible with water in the concentration range used or completely dissolves in water in the concentration range used.

In one embodiment of the invention, an organic base is used. Suitable organic bases are trialkylamines, wherein the alkyl groups preferably are the same or different and have 1 to 5 carbon atoms, pyridine derivatives or salts, in particular alkali metal salts, of carboxylic acids, wherein the carboxylic acid preferably has 1 to 5 carbon atoms, in particular 1, 2 or 3 carbon atoms, for example, potassium acetate. In a preferred embodiment of the invention, the organic base used is a pyridine derivative, in particular unsubstituted pyridine or a mono- or polyalkyl-substituted pyridine derivative. Particular preference is given to 2-alkyl substituted pyridines and 2,6-dialkyl substituted pyridines, wherein the alkyl groups are the same or different and preferably have 1 to 10 carbon atoms, particularly preferably 1 to 4 carbon atoms. Very particular preference is given to 2,6-lutidine (2,6-dimethylpyridine), since this gives the best overall yield, and in particular the best yield of the facial isomer.

In a further embodiment of the invention, an inorganic base is used. Suitable inorganic bases are salts of hydroxide, phosphate, hydrogen phosphate or sulfite, wherein alkali metal ions, in particular Na or K, are preferably used as counterions. Examples of suitable inorganic bases are NaOH, KOH, $Na_2SO_3$, $K_3PO_4$ or $Na_2HPO_4$.

Since it is an object of the added base to scavenge the acid resulting from the complexing reaction, the base is preferably used approximately stoichiometrically or superstoichiometrically based on the ligand used. Thus, in the inventive process, when adding a base, the ratio of ligand to base is preferably selected to be of the order of 1:0.5 to 1:5, particularly preferably 1:0.7 to 1:3, and very particularly preferably 1:1 to 1:1.5. This ratio is also preferred when an inorganic salt is added instead of a base or in addition to a base. The ratio of ligand to base when using a tripodal hexadentate ligand is preferably of the order of 1:1.5 to 1:15, particularly preferably 1:2 to 1:9, and very particularly preferably 1:3 to 1:5.

If the inventive process is carried out in the presence of an inorganic salt, salts of chloride, bromide, iodide, hydrogen sulfate or sulfate are especially suitable, wherein alkali metal ions or else alkaline earth metal ions are preferably used as counterions. Examples of suitable inorganic salts are NaCl, KCl, Kl, $CaCl_2$), $NaHSO_4$ or $Na_2SO_4$.

The reaction is carried out according to the invention in aqueous medium, the reaction usually taking place in a multiphase mixture of suspensions. The product generally precipitates from the reaction mixture. Water or a mixture of water with one or more organic solvents can be used as solvent in the inventive process. If a mixture of water and one or more organic solvents is used, preference is given to use those organic solvents which are miscible with water, in particular those which are miscible with water in any proportion. These are in particular polar protic and polar aprotic solvents.

Suitable polar protic solvents are alcohols, in particular alcohols having 1 to 5 carbon atoms, for example methanol, ethanol, n-propanol, isopropanol, n-butanol, isobutanol or tert-butanol, or else diols or polyalcohols, for example ethylene glycol, propylene glycol, glycerol, polyethylene glycols, for example PEG600 and PEG1000, and also alkoxy alcohols, for example methoxyethanol or ethoxyethanol. Suitable polar aprotic solvents are water-miscible open-chain ethers, for example triethylene glycol dimethyl ether, poly(ethylene glycol) dimethyl ether, water-miscible cyclic ethers, such as dioxane or THF, and also DMSO, NMP and DMF.

If an organic solvent is used in the inventive process, this is preferably a polar aprotic solvent, particularly preferably a cyclic water-miscible ether, in particular dioxane.

It is preferred if the proportion of water in the reaction medium is at least 80% by volume, particularly preferably at least 90% by volume, very particularly preferably at least 95% by volume and especially preferably at least 99% by volume. Most preferred is the use of water without the addition of an organic solvent as reaction medium.

The water used is preferably distilled water or demineralized water (deionized water) having a pH of 5 to 9, preferably 6 to 8 and particularly preferably having a pH of 6.8 to 7.2, in particular having a pH=7.

The reaction is preferably carried out in a temperature range of 80 to 250° C., particularly preferably of 100 to 200° C., very particularly preferably of 120 to 170° C. and especially preferably of 130 to 160° C., wherein this temperature is the jacket temperature of the reaction vessel.

In a preferred embodiment, the reaction is carried out in a closed system, for example in a closed ampoule, under reflux. In this case, the reaction is preferably carried out under a protective gas, for example nitrogen or argon. Here, the pressure corresponds to the vapor pressure over the solution. The reaction can also be carried out under elevated pressure, for example in an autoclave.

The concentration of iridium in the reaction medium is preferably in the range of 1 to 300 mmol/l, particularly preferably in the range of 10 to 250 mmol/l, very particularly preferably in the range of 100 to 200 mmol/l.

The preferred molar ratio of iridium to the ligand used in the reaction medium depends on the iridium reactant used and on the ligand used. Thus, a ratio of the iridium compound according to formula (3) or formula (4) or formula (5) or formula (6) to the ligand according to formula (2) from 1:1 to 1:20 is preferably used, particularly preferably 1:3 to 1:15, very particularly preferably 1:10 to 1:13, when this relates to bidentate ligands. The preferred molar ratio of the iridium compound according to formula (7) to the ligand according to formula (2) is 1:1 to 1:20, particularly preferably 1:2 to 1:10, very particularly preferably 1:3 to 1:5, when this relates to bidentate ligands. When using a polypodal hexadentate ligand, a ratio of Ir to ligand of 1:0.9 to 1:1 is preferred, in particular a ratio of 1:1 to 1:1.05.

Since the ligand is usually used in excess when using bidentate ligands, it may be useful, especially in the case of elaborately synthesizable ligands, to recover this after the reaction. This may for example be achieved by extraction of the mother liquor with a water-immiscible solvent.

The reaction is preferably carried out within 1 to 1000 h, particularly preferably within 5 to 500 h, very particularly preferably within 10 to 200 h.

Further acceleration of the reaction can be achieved, for example, by using microwave radiation. How cyclometalation reactions can generally be carried out in the microwave is described, for example, in WO 2004/108738.

The work-up of the reaction mixture is simple in the inventive process, since the cyclometalated iridium compound usually precipitates at least partially or completely in the reaction. This can be completed by precipitation with a solvent in which the iridium compound is insoluble, for example with an alcohol, e.g. ethanol, or a mixture of an alcohol and water. The product may then be isolated and purified by filtration and washing with a solvent in which it is insoluble, for example with water, an alcohol, e.g. ethanol, or a mixture of an alcohol and water. If necessary, further purification may be carried out by the general methods which are customary for such iridium complexes, for instance recrystallization, chromatography, hot extraction and/or sublimation.

The process according to the invention offers the following advantages over the prior art:

1. The inventive process makes it possible to obtain triscyclometalated iridium complexes from readily available iridium halide in one step and in very good yield, while many processes according to the prior art start from more complex reactants, for example iridium ketoketonate complexes or chloro-bridged dimeric iridium complexes, and/or have poorer yields.
2. The inventive process does not require the use of organic solvents which are generally combustible and commonly toxic and pose disposal problems, since the process can also be carried out without the addition of organic solvents and even gives the best results without the addition of organic solvents. It is thus a more environmentally-friendly process compared to the processes according to the prior art. This is of particular interest on an industrial scale.
3. In processes according to the prior art, side reactions of the organic solvent used with the ligand are commonly observed, which possibly take place with catalysis by the iridium in the reaction mixture. Although these side reactions take place only to a small extent, the by-products contaminate the reaction product. However, since highly pure iridium compounds are required for use in organic electroluminescent devices, this side reaction leads to an increased expense in the purification of the complexes. This side reaction is not observed in the present process when using water as a solvent.

The present invention will be further illustrated by the following examples, without intending to limit it to the examples. For those skilled in the art in the field of organic and organometallic synthesis, it is possible to carry out the reactions of the invention in other systems without further inventive step. In particular, the process can be carried out without further inventive step on differently substituted systems or else on systems which contain other aryl or heteroaryl groups as coordinating groups instead of phenyl or pyridine. Likewise, those skilled in the art can carry out the inventive process with the addition of other bases and/or salts or other solvents.

EXAMPLES

The syntheses which follow, unless stated otherwise, are conducted under a protective gas atmosphere. Iridium(III) chloride hydrate can be obtained from Heraeus and, according to iridium and water content determination, corresponds to the formula $IrCl_3 \cdot H_2O$. 2-phenylpyridine and the substituted 2-phenylpyridines or the other ligands can be obtained from Aldrich or ABCR or prepared according to common procedures from the literature. The surfactants which are not available from Aldrich or ABCR can be obtained from Sasol.

Example 1: General Reaction Procedure 30.05 g of $IrCl_3 \cdot H_2O$, 30.16 g of 2,6-lutidine, 160.0 g of 2-phenylpyridine, 10.05 g of Marlon A375 and 268.0 g of demineralized water are added to a 750 ml pressure stirrer apparatus with PTFE inliner at room temperature. The reaction vessel is briefly purged with $N_2$, sealed, heated to a jacket temperature $T_M = 150°$ C. and stirred for 161 h at low speed. The suspension is then cooled to room temperature and 125 ml of deionized water and 375 ml of ethanol are added. After stirring for 30 minutes, the solid is filtered off with suction, washed with 5×100 ml of deionized water and 5×100 ml of ethanol and dried by suction. The solid is dried for 60 h at 40° C. under reduced pressure. 52.14 g (92.0% of theory) of a yellow solid having a content of >99.6% fac-IrPPy are obtained. If necessary, further purification by recrystallization, chromatography, hot extraction and/or sublimation may be carried out. After a reaction time of 170 h no further mer fraction can be seen analytically.

Example 2: Variation of the Proportion of Base, of the Proportion of Surfactant and of the Proportion of Ligand The process described in example 1 is carried out analogously, using different proportions of the base, of the surfactant and of the ligand. The reaction time is 20-24 h. The following results are achieved:

| Example | Proportion ligand* | Proportion base* | % Surfactant** | % Yield | % Facial |
|---|---|---|---|---|---|
| 2a | 12 | 3:5 | 33 | 92 | 99.6 |
| 2b | 9 | 6 | 60 | 85 | 96.9 |
| 2c | 8 | 7.5 | 33 | 82 | 96.5 |
| 2d | 3.5 | 8 | 33 | 85 | 96 |
| 2e | 9 | 1 | 20 | 85 | 98 |
| 2f | 3.5 | 16 | 33 | 76 | 82 |
| 2g | 6 | 3.5 | 60 | 85 | 94 |
| 2h | 8 | 3.5 | 6 | 82 | 89 |
| 2i | 6 | 3.5 | 22 | 90 | 91 |
| 2j | 12 | 3.5 | 22 | 90 | 93 |
| 2k | 9 | 1 | 6 | 86 | 83 |

*The proportion of ligand and the proportion of base relates to the equivalents in relation to the iridium starting material.
**The proportion of surfactant relates to the weight percent of $IrCl_3 \cdot H_2O$.

As can be seen, the cyclometalated iridium complex can be obtained by the inventive process in very good yields and with a high proportion of the facial isomer.

Example 3: Variation of the Surfactant

The process described in example 1 is carried out analogously using another surfactant or surfactant mixture. The reaction time is 20-24 h. The following results are achieved:

| Example | Surfactant (mixture) | 2,6-Lutidine* | % Yield | % Facial |
|---|---|---|---|---|
| 3a | Extran MA02 | + | 85 | 88 |
| 3b | Extran MA02 | − | 83 | 44 |
| 3c | Marlipal SU | + | 71 | 27 |
| 3d | Marlipal SU | − | 78 | 23 |
| 3e | Marlon A375 | + | 85 | 92 |
| 3f | Marlon A375 | − | 76 | 48 |
| 3g | Marlopon AT50 | + | 88 | 92 |
| 3h | Marlopon AT50 | − | 74 | 40 |
| 3i | Na-polyphosphate | + | 71 | 29 |
| 3j | Na-polyphosphate | − | 76 | 29 |
| 3k | Kathon | + | 68 | 25 |
| 3l | Kathon | − | 84 | 20 |
| 3m | Marlon AS3 | + | 84 | 90 |
| 3n | Marlon AS3 | − | 75 | 42 |
| 3o | Marlon ARL | + | 75 | 87 |
| 3p | Marlon ARL | − | 84 | 51 |
| 3q | Marlinat 242/70C | + | 84 | 94 |
| 3r | Marlinat 242/70C | − | 71 | 33 |
| 3s | Marlinat 242/90M | + | 85 | 86 |
| 3t | Marlinat 242/90M | − | 74 | 34 |
| 3u | Marlowet 4539LF | + | 86 | 58 |
| 3v | Marlowet 4539LF | − | 73 | 24 |
| 3w | Marlowet 4570LF | + | 73 | 36 |
| 3x | Marlowet 4570LF | − | 72 | 24 |
| 3y | KNA Cum sulph | + | 76 | 53 |
| 3z | KNA Cum sulph | − | 73 | 38 |
| 3aa | NA Cum sulph | + | 80 | 48 |
| 3ab | NA Cum sulph | − | 78 | 27 |

*+ means addition of lutidine, − means without addition of lutidine.

Example 4: Variation of the Ligand

The process described in example 1 is carried out analogously using different ligands. In all cases, the corresponding homoleptic iridium complex is formed, as shown in the following table:

| Ex-ample | Ligand structure | Complex structure |
| --- | --- | --- |
| 4a | | |
| 4b | (WO 2005/03324) | |
| 4c | | |

| Example | Ligand structure | Complex structure |
|---|---|---|
| 4d | | |

Example 5: Use of a Tripodal Hexadentate Ligand

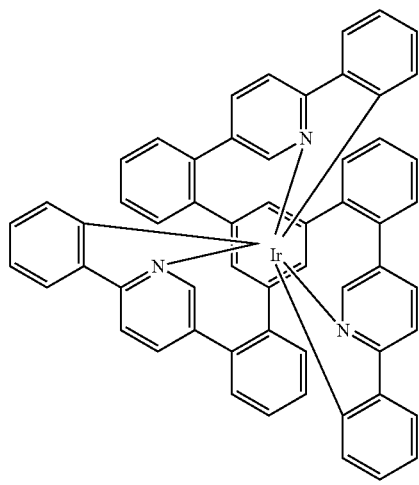

3.2 g of IrCl$_3$.H$_2$O, 3.3 g of 2,6-lutidine, 7.7 g of 5-[2-[3,5-bis[2-(6-phenyl-3-pyridyl)phenyl]phenyl]phenyl]-2-phenylpyridine [1989598-11-9], 1.0 g of Marlon A375 and 50 ml of deionized water are initially charged in a 100 ml pressure Schlenk tube with magnetic stirrer bar at room temperature. The reaction vessel is briefly purged with N$_2$, sealed and heated with stirring for 16 h to T$_M$=150° C. The suspension is then cooled to room temperature and 40 ml of ethanol are added. After stirring for 30 minutes, the yellow solid is filtered off with suction, washed with 5×25 ml of deionized water and 5×25 ml of ethanol and dried by suction. The solid is dried for 20 h at 80° C. under reduced pressure. 9.4 g (98% of theory) of a yellow solid are obtained. If necessary, further purification by recrystallization, hot extraction, chromatography or sublimation may be carried out.

In an analogous manner, it is possible to prepare the following compounds:

| Ex. | Reactant (CAS number) | Product | Yield |
|---|---|---|---|
| 5a | 1989599-76-9 | 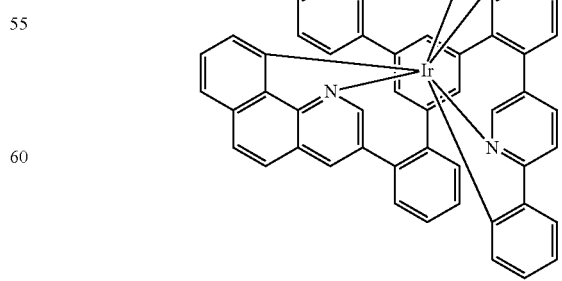 1989605-64-2 | 97% |

-continued

| Ex. | Reactant (CAS number) | Product | Yield |
|---|---|---|---|
| 5b | 1989600-01-2 | 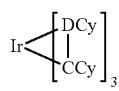<br>1989606-31-6 | 97% |

The invention claimed is:

1. A process for preparing a tris-cyclometalated iridium complex comprising reacting an iridium compound with a bidentate ligand or with a hexadentate tripodal ligand, wherein the hexadentate tripodal ligand comprises three bidentate sub-ligands, wherein the bidentate ligand or the bidentate sub-ligands coordinate to the iridium via cyclometalation, wherein the process is carried out in an aqueous medium and in the presence of an anionic surfactant and wherein the tris-cyclometalated iridium complex comprises a structure of formula (1):

$$Ir\begin{bmatrix} DCy \\ | \\ CCy \end{bmatrix}_3 \quad (1)$$

wherein:
DCy is the same or different in each instance and is a heteroaryl group having 5 to 14 aromatic ring atoms and which comprises at least one neutral donor atom selected from the group consisting of nitrogen and a carbene carbon m via which the heteroaryl group is bonded to the iridium, wherein the heteroaryl group is optionally substituted by one or more substituents R;
CCy is the same or different in each instance and is an aryl or heteroaryl group having 5 to 14 aromatic ring atoms and which comprises a carbon atom via which the aryl or heteroaryl group is bonded to the iridium, and wherein the aryl or heteroaryl is optionally substituted by one or more substituents R;
wherein the groups DCy and CCy are connected to one another via a covalent bond and are optionally also connected to one another via a radical R;
R is the same or different in each instance and is H, D, F, Cl, Br, I, $NO_2$, CN, OH, $N(R^1)_2$, $OR^1$, $SR^1$, $B(OR^1)_2$, CHO, COOH, $CON(R^1)_2$, $C(=O)R^1$, $P(=O)(R^1)_2$, $S(=O)R^1$, $S(=O)_2R^1$, $Si(R^1)_3$, a straight-chain alkyl group having 1 to 20 carbon atoms or an alkenyl or alkynyl group having 2 to 20 carbon atoms or a branched or cyclic alkyl group having 3 to 20 carbon atoms, wherein the alkyl, alkenyl, or alkynyl group are in each case optionally substituted by one or more radicals $R^1$ and/or wherein one or more non-adjacent $CH_2$ groups are optionally replaced by 0, S, $NR^1$, $CONR^1$, or CO—O, or an aromatic or heteroaromatic ring system having 5 to 40 aromatic ring atoms and which is optionally substituted by one or more radicals $R^1$; and wherein two or more substituents R, either on the same ring CCy or DCy or on both rings CCy and DCy, optionally define a further ring system with one another or with a substituent $R^1$;
$R^1$ is the same or different at each instance and is H, D, F, Cl, Br, I, $N(R^2)_2$, $OR^2$, $SR^2$, CN, $NO_2$, $Si(R^2)_3$, $B(OR^2)_2$, $C(=O)R^2$, $P(=O)(R^2)_2$, $S(=O)R^2$, $S(=O)_2R^2$, $OSO_2R^2$, a straight-chain alkyl group having 1 to 20 carbon atoms or an alkenyl or alkynyl group having 2 to 20 carbon atoms or a branched or cyclic alkyl group having 3 to 20 carbon atoms, wherein the alkyl, alkenyl, or alkynyl group are in each case optionally substituted by one or more $R^2$ radicals and/or wherein one or more non-adjacent $CH_2$ groups are optionally replaced by $Si(R^2)_2$, C=O, $NR^2$, O, S, or $CONR^2$, or an aromatic or heteroaromatic ring system having 5 to 40 aromatic ring atoms and which is optionally substituted in each case by one or more radicals $R^2$; and wherein a plurality of substituents $R^1$ optionally define a ring system with one another;
$R^2$ is the same or different in each instance and is H, D, F, or an aliphatic, aromatic, and/or heteroaromatic organic radical having 1 to 20 carbon atoms, wherein one or more hydrogen atoms are optionally replaced by F; and
wherein two CCy-DCy ligands are optionally joined to one another via one or more radicals R so as to define a tetradentate ligand or all three CCy-DCy ligands are optionally joined to one another via two or more radicals R so as to define a tripodal hexadentate ligand.

2. The process of claim 1, wherein the CCy-DCy ligand of formula (1) is a compound of formula (2a):

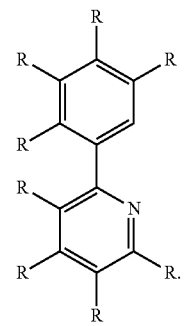

3. The process of claim 1, wherein the anionic surfactant is selected from the group consisting of alkyl carboxylates of formula $R^1$—$COO^-$, wherein $R^1$ is a saturated or unsaturated alkyl radical having 5 to 25 carbon atoms, alcohol ether carboxylates of formula $C_nH_{2n+1}$—$(O-C_2H_4)_m$—$COO^-$, wherein n is an integer from 5 to 25 and m is an integer from 5 to 25, alkylbenzenesulfonates of formula $C_nH_{2n+1}$—$C_6H_5$—$SO_3$, wherein n is an integer from 5 to 25, alkylsulfonates of formula $C_nH_{2n+1}$—$SO_3^-$, wherein n is an integer from 5 to 25, alkyl ether sulfates of formula $C_nH_{2n+1}$—$(O$—$C_2H_4)_m$—$O$—$SO_3^-$, wherein n is an integer from 5 to 25 and m is an integer from 5 to 25, alcohol sulfates of formula $C_nH_{2n+1}$—$O$—$SO_3^-$, wherein n is an integer from 5 to 25, and any combination thereof.

4. The process of claim 1, wherein the anionic surfactant comprises an alkali metal, an alkaline earth metal, an ammonium, a tetraalkylammonium, a tetraalkylphosphonium, and/or a tetraarylphosphonium cation as a counterion.

5. The process of claim 1, wherein the process is carried out in the presence of an additive selected from the group consisting of organic bases, inorganic bases, and inorganic salts.

6. The process of claim 1, wherein the additive is an organic base selected from the group consisting of trialkylamines, pyridine derivatives, and salts of carboxylic acids, or wherein the additive is an inorganic base selected from the group consisting of hydroxide salts, phosphate salts, hydrogenphosphate salts, and sulphite salts, or wherein the additive is an inorganic salt selected from the group consisting of chloride salts, bromide salts, iodide salts, hydrogensulfate salts, and sulfate salts.

7. The process of claim 1, wherein the process is carried out in water or a mixture of water and one or more polar protic and/or polar aprotic solvents.

8. The process of claim 7, wherein water is used as a reaction medium without the addition of organic solvents.

9. The process of claim 1, wherein the reaction is carried out at a temperature in the range of from 80 to 250° C.

10. The process of claim 1, wherein $R^2$ is a hydrocarbyl radical.

11. The process of claim 6, wherein the pyridine derivatives comprise 2,6-dialkylpyridine derivatives.

12. A process for preparing a tris-cyclometalated iridium complex comprising reacting an iridium compound with a bidentate ligand or with a hexadentate tripodal ligand, wherein the hexadentate tripodal ligand comprises three bidentate sub-ligands, wherein the bidentate ligand or the bidentate sub-ligands coordinate to the iridium via cyclometalation, wherein the process is carried out in an aqueous medium and in the presence of a surfactant which comprises an n-$C_{10}$-$C_{13}$-alkylbenzenesulfonate, an n-$C_{12}$-$C_{14}$-alkyl polyethylene glycol ether sulfate, or a mixture thereof and wherein the tris-cyclometalated iridium complex comprises a structure of formula (1):

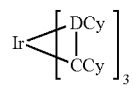

(1)

wherein:
DCy is the same or different in each instance and is a heteroaryl group having 5 to 14 aromatic ring atoms and which comprises at least one neutral donor atom selected from the group consisting of nitrogen and a carbene carbon atom via which the heteroaryl group is bonded to the iridium, wherein the heteroaryl group is optionally substituted by one or more substituents R;
CCy is the same or different in each instance and is an aryl or heteroaryl group having 5 to 14 aromatic ring atoms and which comprises a carbon atom via which the aryl or heteroaryl group is bonded to the iridium, and wherein the aryl or heteroaryl is optionally substituted by one or more substituents R;

wherein the groups DCy and CCy are connected to one another via a covalent bond and are optionally also connected to one another via a radical R;
R is the same or different in each instance and is H, D, F, Cl, Br, I, $NO_2$, CN, OH, $N(R^1)_2$, $OR^1$, $SR^1$, $B(OR^1)_2$, CHO, COOH, $CON(R^1)_2$, $C(=O)R^1$, $P(=O)(R^1)_2$, $S(=O)R^1$, $S(=O)_2R^1$, $Si(R^1)_3$, a straight-chain alkyl group having 1 to 20 carbon atoms or an alkenyl or alkynyl group having 2 to 20 carbon atoms or a branched or cyclic alkyl group having 3 to 20 carbon atoms, wherein the alkyl, alkenyl, or alkynyl group are in each case optionally substituted by one or more radicals $R^1$ and/or wherein one or more non-adjacent $CH_2$ groups are optionally replaced by O, S, $NR^1$, $CONR^1$, or CO—O, or an aromatic or heteroaromatic ring system having 5 to 40 aromatic ring atoms and which is optionally substituted by one or more radicals $R^1$; and wherein two or more substituents R, either on the same ring CCy or DCy or on both rings CCy and DCy, optionally define a further ring system with one another or with a substituent $R^1$;
$R^1$ is the same or different at each instance and is H, D, F, Cl, Br, I, $N(R^2)_2$, $OR^2$, $SR^2$, CN, $NO_2$, $Si(R^2)_3$, $B(OR^2)_2$, $C(=O)R^2$, $P(=O)(R^2)_2$, $S(=O)R^2$, $S(=O)_2R^2$, $OSO_2R^2$, a straight-chain alkyl group having 1 to 20 carbon atoms or an alkenyl or alkynyl group having 2 to 20 carbon atoms or a branched or cyclic alkyl group having 3 to 20 carbon atoms, wherein the alkyl, alkenyl, or alkynyl group are in each case optionally substituted by one or more $R^2$ radicals and/or wherein one or more non-adjacent $CH_2$ groups are optionally replaced by $Si(R^2)_2$, C=O, $NR^2$, O, S, or $CONR^2$, or an aromatic or heteroaromatic ring system having 5 to 40 aromatic ring atoms and which is optionally substituted in each case by one or more radicals $R^2$; and wherein a plurality of substituents $R^1$ optionally define a ring system with one another;
$R^2$ is the same or different in each instance and is H, D, F, or an aliphatic, aromatic, and/or heteroaromatic organic radical having 1 to 20 carbon atoms, wherein one or more hydrogen atoms are optionally replaced by F; and
wherein two CCy-DCy ligands are optionally joined to one another via one or more radicals R so as to define a tetradentate ligand or all three CCy-DCy ligands are optionally joined to one another via two or more radicals R so as to define a tripodal hexadentate ligand.

13. The process of claim 1, wherein the iridium compound is a compound selected from the group consisting of formulae (3) through (8):

(3)

(4)

(5)

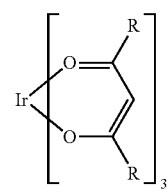

(6)

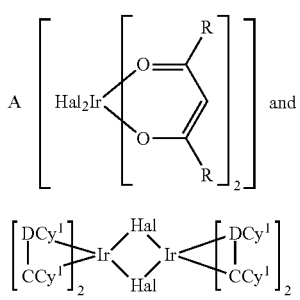

wherein
DCy¹ is the same or different in each instance and is a heteroaryl group having 5 to 14 aromatic ring atoms and which comprises at least one neutral donor atom selected from the group consisting of nitrogen and a carbene carbon atom via which the heteroaryl group is bonded to the iridium, wherein the heteroaryl group is optionally substituted by one or more substituents R;

CCy¹ is the same or different in each instance and is an aryl or heteroaryl group having 5 to 14 aromatic ring atoms and which comprises a carbon atom via which the aryl or heteroaryl group is bonded to the iridium, and wherein the aryl or heteroaryl is optionally substituted by one or more substituents R;

wherein the groups DCy¹ and CCy¹ are connected to one another via a covalent bond and are optionally also connected to one another via a radical R;

wherein two CCy¹-DCy¹ ligands are optionally joined to one another via one or more radicals R so as to define a tetradentate ligand;

R is the same or different in each instance and is H, D, F, Cl, Br, I, NO$_2$, CN, OH, N(R¹)$_2$, OR¹, SR¹, B(OR¹)$_2$, CHO, COOH, CON(R¹)$_2$, C(=O)R¹, P(=O)(R¹)$_2$, S(=O)R¹, S(=O)$_2$R¹, Si(R¹)$_3$, a straight-chain alkyl group having 1 to 20 carbon atoms or an alkenyl or alkynyl group having 2 to 20 carbon atoms or a branched or cyclic alkyl group having 3 to 20 carbon atoms, wherein the alkyl, alkenyl, or alkynyl group are in each case optionally substituted by one or more radicals R¹ and/or wherein one or more non-adjacent CH$_2$ groups are optionally replaced by O, S, NR¹, CONR¹, or CO—O, or an aromatic or heteroaromatic ring system having 5 to 40 aromatic ring atoms and which is optionally substituted by one or more radicals R¹; and wherein two or more substituents R, either on the same ring CCy¹ or DCy¹ or on both rings CCy¹ and DCy¹, optionally define a further ring system with one another or with a substituent R¹;

R¹ is the same or different at each instance and is H, D, F, Cl, Br, I, N(R²)$_2$, OR², SR², CN, NO$_2$, Si(R²)$_3$, B(OR²)$_2$, C(=O)R², P(=O)(R²)$_2$, S(=O)R², S(=O)$_2$R², OSO$_2$R², a straight-chain alkyl group having 1 to 20 carbon atoms or an alkenyl or alkynyl group having 2 to 20 carbon atoms or a branched or cyclic alkyl group having 3 to 20 carbon atoms, wherein the alkyl, alkenyl, or alkynyl group are in each case optionally substituted by one or more R² radicals and/or wherein one or more non-adjacent CH$_2$ groups are optionally replaced by Si(R²)$_2$, C=O, NR², O, S, or CONR², or an aromatic or heteroaromatic ring system having 5 to 40 aromatic ring atoms and which is optionally substituted in each case by one or more radicals R²; and wherein a plurality of substituents R¹ optionally define a ring system with one another;

R² is the same or different in each instance and is H, D, F, or an aliphatic, aromatic, and/or heteroaromatic organic radical having 1 to 20 carbon atoms, wherein one or more hydrogen atoms are optionally replaced by F;

Hal is the same or different in each instance and is F, Cl, Br, or I;

A is the same or different in each instance and is an alkali metal cation, an ammonium cation, a tetraalkylammonium cation having 4 to 40 carbon atoms, or a tetraalkylphosphonium cation having 4 to 40 carbon atoms;

z is an integer from 0 to 100; and

Y is an integer from 0 to 100.

14. The process of claim 1, wherein the tris-cyclometalated iridium complex is a homoleptic complex.

15. The process of claim 1, wherein the tris-cyclometalated iridium complex has facial geometry.

* * * * *